(12) United States Patent
Raj et al.

(10) Patent No.: US 11,580,456 B2
(45) Date of Patent: Feb. 14, 2023

(54) SYSTEM TO CORRECT MODEL DRIFT IN MACHINE LEARNING APPLICATION

(71) Applicant: BANK OF AMERICA CORPORATION, Charlotte, NC (US)

(72) Inventors: Utkarsh Raj, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 379 days.

(21) Appl. No.: 16/859,684

(22) Filed: Apr. 27, 2020

(65) Prior Publication Data

US 2021/0334695 A1 Oct. 28, 2021

(51) Int. Cl.
*G06N 20/00* (2019.01)
*G06F 11/34* (2006.01)

(52) U.S. Cl.
CPC ......... *G06N 20/00* (2019.01); *G06F 11/3409* (2013.01)

(58) Field of Classification Search
CPC .............................. G06N 20/00; G06F 11/3409
See application file for complete search history.

(56) References Cited

U.S. PATENT DOCUMENTS

| | | |
|---|---|---|
| 6,577,952 B2 | 6/2003 | Geier et al. |
| 6,633,814 B2 | 10/2003 | Kohli et al. |
| 6,711,503 B2 | 3/2004 | Haaland |
| 6,917,839 B2 | 7/2005 | Bickford |
| 7,143,091 B2 | 11/2006 | Charnock et al. |
| 7,460,958 B2 | 12/2008 | Walsh et al. |
| 7,587,296 B2 | 9/2009 | Harvey, Jr. et al. |
| 7,630,950 B2 | 12/2009 | Wang et al. |
| 7,710,822 B2 | 5/2010 | Harmon |
| 7,761,239 B2 | 7/2010 | Chen et al. |
| 7,764,714 B2 | 7/2010 | Monier et al. |
| 7,812,305 B2 | 10/2010 | Miller et al. |
| 8,134,499 B2 | 3/2012 | Wang et al. |
| 8,144,508 B2 | 3/2012 | Franceschini et al. |
| 8,578,246 B2 | 11/2013 | Mittelholzer et al. |
| 8,582,807 B2 | 11/2013 | Yang et al. |
| 8,665,645 B2 | 3/2014 | Avraham et al. |
| 8,756,001 B2 | 6/2014 | Georgy et al. |
| 8,837,530 B2 | 9/2014 | Agrawala et al. |
| 8,856,694 B2 | 10/2014 | Ye et al. |
| 8,957,909 B2 | 2/2015 | Joseph et al. |
| 9,128,173 B1 | 9/2015 | Witzgall |
| 9,165,051 B2 | 10/2015 | Masud et al. |
| 9,191,380 B2 | 11/2015 | Anderson et al. |
| 9,361,273 B2 | 6/2016 | Dannecker et al. |
| 9,433,376 B2 | 9/2016 | Estes et al. |
| 9,571,512 B2 | 2/2017 | Ray et al. |
| 9,801,575 B2 | 10/2017 | Bohm et al. |
| 9,812,290 B2 | 11/2017 | Phaneuf et al. |

(Continued)

*Primary Examiner* — Roberto Borja (57) ABSTRACT

A model correction tool automatically detects and corrects model drift in a model for a machine learning application. To detect drift, the tool continuously monitors input data, outputs, and/or technical resources (e.g., processor, memory, network, and input/output resources) used to generate outputs. The tool analyzes changes to input data, outputs, and/or resource usage to determine when drift has occurred. When drift is determined to be occurring, the tool retrains a model for a machine learning application.

14 Claims, 3 Drawing Sheets

(56) References Cited

U.S. PATENT DOCUMENTS

| | | |
|---|---|---|
| 9,857,238 B2 | 1/2018 | Malhotra et al. |
| 10,354,205 B1 * | 7/2019 | Pham ................ G06F 16/24578 |
| 10,599,957 B2 | 3/2020 | Walters et al. |
| 10,599,984 B1 | 3/2020 | Wubbels et al. |
| 11,151,479 B2 * | 10/2021 | Chu ....................... G06N 20/00 |
| 2002/0123951 A1 | 9/2002 | Olsen et al. |
| 2015/0226559 A1 | 8/2015 | Waite et al. |
| 2016/0071027 A1 | 3/2016 | Brand et al. |
| 2016/0170871 A1 | 6/2016 | Hyun et al. |
| 2016/0371601 A1 | 12/2016 | Grove et al. |
| 2017/0124450 A1 | 5/2017 | Hara et al. |
| 2017/0132383 A1 * | 5/2017 | Myers ................. G06F 3/04847 |
| 2017/0135577 A1 | 5/2017 | Komogortsev |
| 2017/0153962 A1 * | 6/2017 | Biegun ............... G06F 11/3024 |
| 2017/0176600 A1 | 6/2017 | Vollath et al. |
| 2017/0235377 A1 | 8/2017 | Marcolina et al. |
| 2017/0330109 A1 * | 11/2017 | Maughan ................. G06N 5/02 |
| 2019/0349715 A1 | 11/2019 | Ghourchian et al. |

* cited by examiner

SYSTEM TO CORRECT MODEL DRIFT IN MACHINE LEARNING APPLICATION

TECHNICAL FIELD

This disclosure relates generally to detecting, alerting, and correcting machine learning model drift and integrating it in a model governance tool and/or a machine learning application.

BACKGROUND

Machine learning applications apply models to input data to make predictions.

SUMMARY OF THE DISCLOSURE

Machine learning applications apply models to input data to make predictions that may have profound impacts on the world or in the lives of users. Generally, a machine learning application maps values from an input domain into an output range for a target variable. The mapping is usually not deterministic or represented using a mathematic formula. Rather, the mapping may be understood as a learned behavior from the input data which models the output target variable. These mappings are also understood as predictions.

For a model to be considered of good quality, the model should correctly map new incoming inputs into the outputs. If the mappings are close to actual outputs, the model is said to be qualitatively accurate. During building of such a model, the builder heavily relies on the static training and test data available for the exercise. However when the configured model is put into production, it is tested with real world data and is expected to model and predict a real world target variable. Such models are routinely examined to ensure that the real world reaction to the new data and output are consistent with the outputs when the model was programmed with the training data. This model-building activity is manual and time-intensive.

The quality of a model may degrade over time as inputs and the variable being modeled change, a phenomenon known as drift. Concept drift or domain drift refers to the drift that occurs when the statistical properties of the target variable being modeled have shifted or changed over time in unforeseen ways. In this case, the model continues to run on the incoming input data, but the real world interpretation of the target variable has shifted from what it used to be (e.g., when the model was created). Models that are generally dependent on human behavior (e.g., socio-economic properties and processes) are greatly exposed to randomness and are particularly prone to degradation through concept or domain drift. As a result, the output of the model is inaccurate or outdated.

Data drift refers to the drift that occurs when the incoming data used by the model change over time, causing the model to automatically drift from its initial state. Machine Learning models, particularly classifier-like and supervised models are tightly coupled with the training data and primarily derive their inferences and overall quality by correctly understanding the correlation between the input data. The quality of such models deteriorate rather quickly if the input data experiences drift in its distribution or quality. Additionally, while there is always an element of randomness, the models are trained to work on identifiable patterns. If the randomness greatly influences the input data, the model fails to make accurate predictions and a drift is observed in the model quality.

Because drift causes models to make inaccurate predictions, it is important to detect drift and correct the models as quickly as possible. Typically, by the time an inconsistency (e.g., in the input or output) is realized, the model has already made inaccurate predictions. These inaccurate predictions may jeopardize the safety of users. For example, during a natural disaster, a machine learning application may be tasked with determining which users need aid and how to get the aid to those users. If the model for the machine learning application makes an inaccurate prediction (e.g., inaccurately predicts the meaning of a user's spoken words or inaccurately predicts the movements of the user), then the user may not receive the requested aid, jeopardizing the user's safety.

This disclosure contemplates a model correction tool that automatically detects and corrects model drift in a model for a machine learning application. To detect drift, the tool continuously monitors input data, outputs, and/or technical resources (e.g., processor, memory, network, and input/output resources) used to generate outputs. The tool analyzes changes to input data, outputs, and/or resource usage to determine when drift has occurred. When drift is determined to be occurring, the tool retrains a model for a machine learning application. In this manner, the tool automatically detects and corrects model drift, which improves the accuracy of the machine learning application. In certain embodiments, improving the accuracy of the machine learning application improves the safety of users. Certain embodiments are described below.

According to an embodiment, an apparatus includes a memory and a hardware processor communicatively coupled to the memory. The hardware processor receives an input data into a machine learning application and compares the input data with previous input data into the machine learning application to determine a change in the input data. The hardware processor also receives an output prediction of the machine learning application made by applying a model on the input data and determines an accuracy of the model by comparing the output with previous outputs generated by the model. The hardware processor further receives an indication of processor resources and memory resources used by the machine learning application to make the output prediction based on the input data and compares the indication of processor resources and memory resources with previous indications of processor resources and memory resources used when applying the model to determine a change in processor resources and memory resources used when applying the model. The hardware processor determines, based on the change in the input data, the accuracy of the model, and the change in processor resources and memory resources used when applying the model, a drift score for the model and retrains the model when the drift score exceeds a threshold.

According to another embodiment, a method includes receiving, by a hardware processor communicatively coupled to a memory, an input data into a machine learning application and comparing, by the hardware processor, the input data with previous input data into the machine learning application to determine a change in the input data. The method also includes receiving, by the hardware processor, an output prediction of the machine learning application made by applying a model on the input data and determining, by the hardware processor, an accuracy of the model by comparing the output with previous outputs generated by the model. The method further includes receiving, by the hardware processor, an indication of processor resources and memory resources used by the machine learning application to make the output prediction based on the input data and comparing, by the hardware processor, the indication of processor resources and memory resources with previous indications of processor resources and memory resources used when applying the model to determine a change in processor resources and memory resources used when applying the model. The method also includes determining, by the hardware processor and based on the change in the input data, the accuracy of the model, and the change in processor resources and memory resources used when applying the model, a drift score for the model and retraining, by the hardware processor, the model when the drift score exceeds a threshold.

According to another embodiment, a system includes a device and a model correction tool. The tool includes a hardware processor communicatively coupled to a memory. The hardware processor receives, from the device, an input data into a machine learning application and compares the input data with previous input data into the machine learning application to determine a change in the input data. The hardware processor also receives an output prediction of the machine learning application made by applying a model on the input data and determines an accuracy of the model by comparing the output with previous outputs generated by the model. The hardware processor further receives an indication of processor resources and memory resources used by the machine learning application to make the output prediction based on the input data and compares the indication of processor resources and memory resources with previous indications of processor resources and memory resources used when applying the model to determine a change in processor resources and memory resources used when applying the model. The hardware processor determines, based on the change in the input data, the accuracy of the model, and the change in processor resources and memory resources used when applying the model, a drift score for the model and retrains the model when the drift score exceeds a threshold.

Certain embodiments provide one or more technical advantages. For example, an embodiment automatically analyzes changes to input data, outputs, and resource usage to determine when model drift has occurred and to retrain the model. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
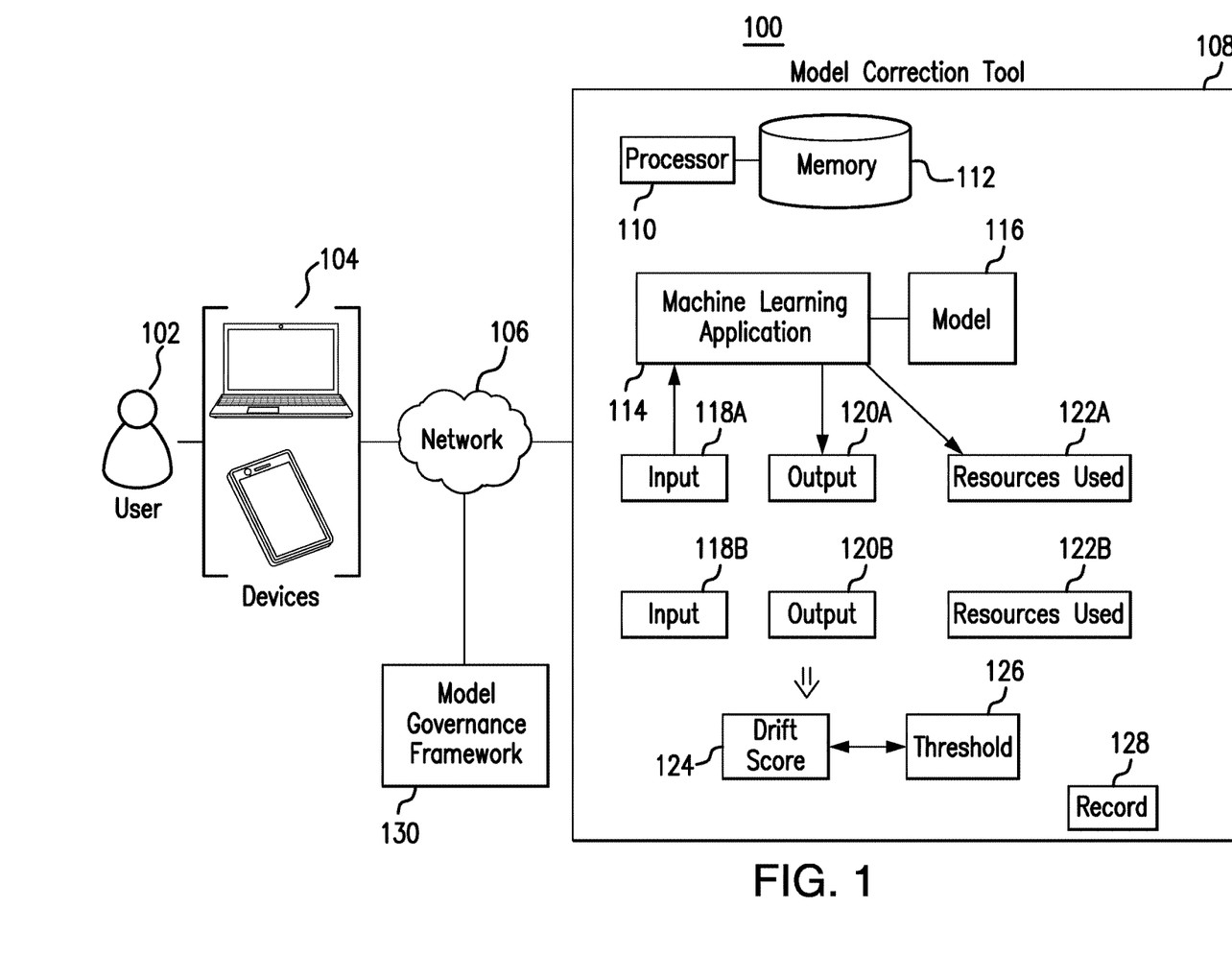
FIG. 1 illustrates an example system.
Figure 2:
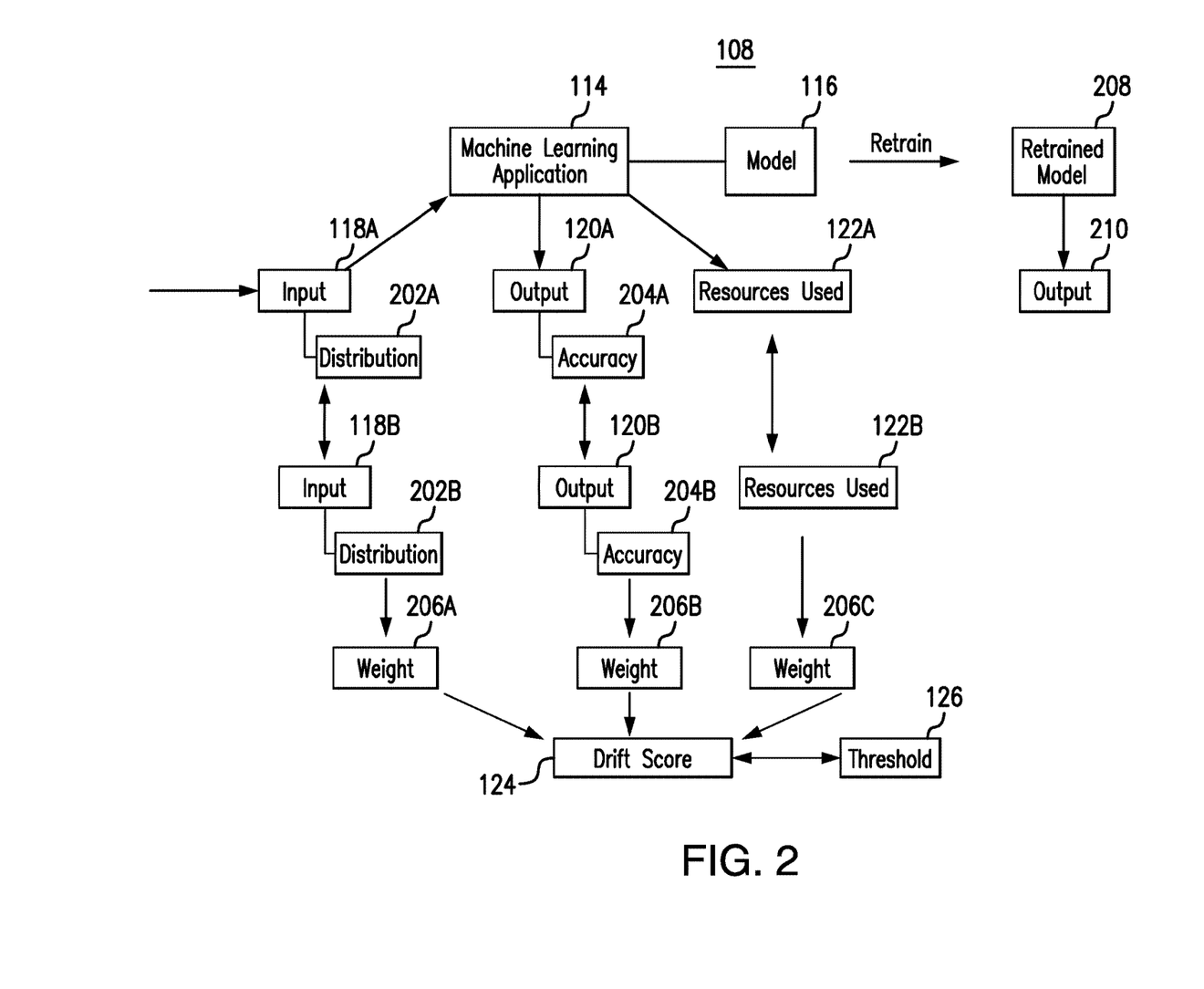
FIG. 2 illustrates an example model correction tool of the system of FIG. 1.
Figure 3:
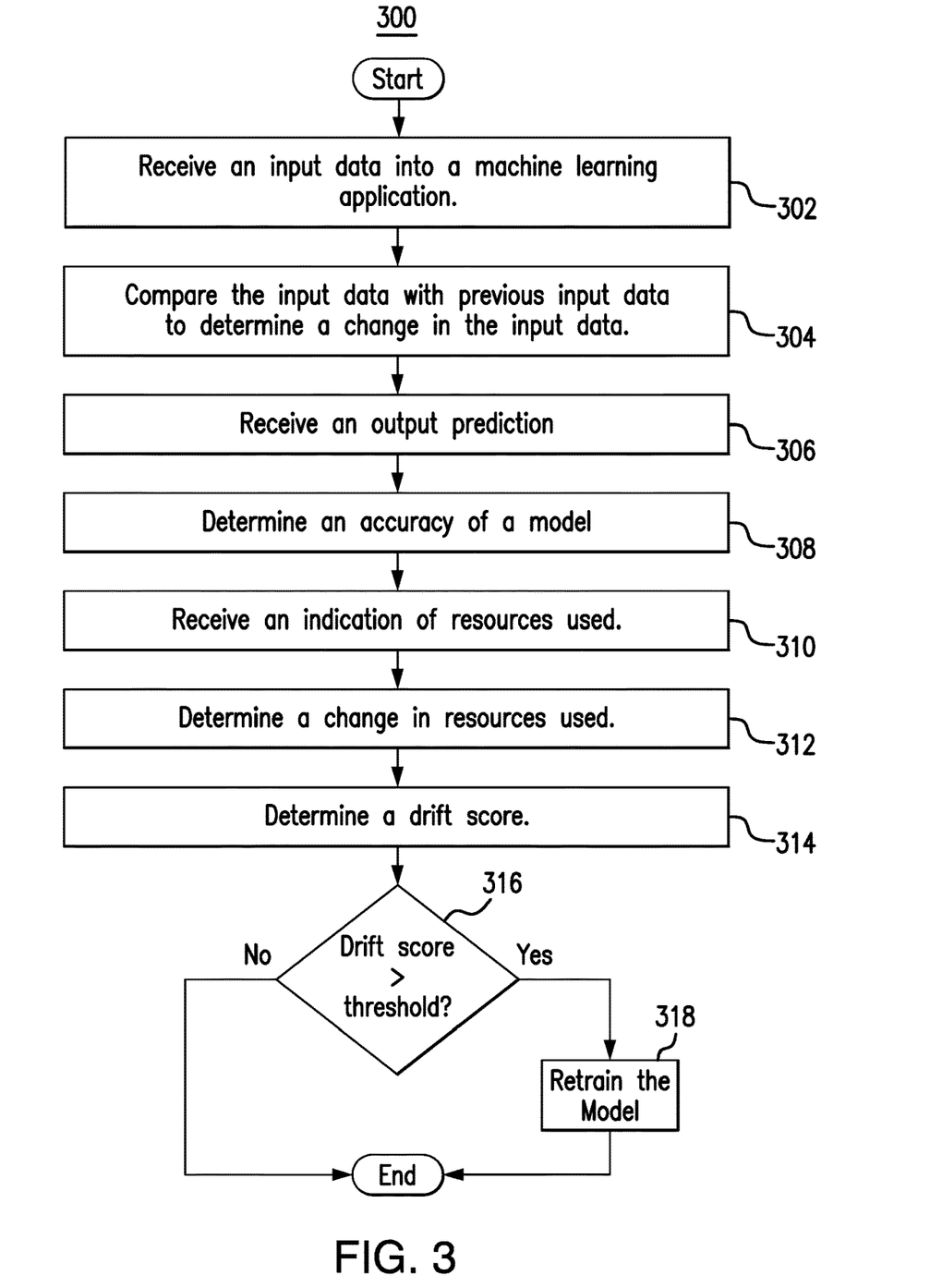
FIG. 3 is a flowchart illustrating a method for operating the model correction tool of the system of FIG. 1.

Embodiments of the present disclosure and its advantages are best understood by referring to FIGS. 1 through 3 of the drawings, like numerals being used for like and corresponding parts of the various drawings.

Machine learning applications apply models to input data to make predictions that may have profound impacts on the world or in the lives of users. Generally, a machine learning application maps values from an input domain into an output range for a target variable. The mapping is usually not deterministic or represented using a mathematic formula. Rather, the mapping may be understood as a learned behavior from the input data which models the output target variable. These mappings are also understood as predictions.

For a model to be considered of good quality, the model should correctly map new incoming inputs into the outputs. If the mappings are close to actual outputs, the model is said to be qualitatively accurate. During building of such a model, the builder heavily relies on the static training and test data available for the exercise. However when the configured model is put into production, it is tested with real world data and is expected to model and predict a real world target variable. Such models are routinely examined to ensure that the real world reaction to the new data and output are consistent with the outputs when the model was programmed with the training data. This model-building activity is manual and time-intensive.

The quality of a model may degrade over time as inputs and the variable being modeled change, a phenomenon known as drift. Concept drift or domain drift refers to the drift that occurs when the statistical properties of the target variable being modeled have shifted or changed over time in unforeseen ways. In this case, the model continues to run on the incoming input data, but the real world interpretation of the target variable has shifted from what it used to be (e.g., when the model was created). Models that are generally dependent on human behavior (e.g., socio-economic properties and processes) are greatly exposed to randomness and are particularly prone to degradation through concept or domain drift. As a result, the output of the model is inaccurate or outdated.

Data drift refers to the drift that occurs when the incoming data used by the model changes over time, causing the model to automatically drift from its initial state. Machine Learning models, particularly classifier-like and supervised models are tightly coupled with the training data and primarily derive their inferences and overall quality by correctly understanding the correlation between the input data. The quality of such models deteriorate rather quickly if the input data experiences drift in its distribution or quality. Additionally, while there is always an element of randomness, the models are trained to work on identifiable patterns. If the randomness greatly influences the input data, the model fails to make accurate predictions and a drift is observed in the model quality.

Because drift causes models to make inaccurate predictions, it is important to detect drift and correct the models as quickly as possible. Typically, by the time an inconsistency (e.g., in the input or output) is realized, the model has already made inaccurate predictions. These inaccurate predictions may jeopardize the safety of users. For example, during a natural disaster, a machine learning application may be tasked with predicting which users need aid and how to get the aid to those users. If the model for the machine learning application makes an inaccurate prediction (e.g., inaccurately predicts the meaning of a user's spoken words or inaccurately predicts the movements of the user), then the user may not receive the requested aid, jeopardizing the user's safety.

This disclosure contemplates a model correction tool that automatically detects and corrects model drift in a model for a machine learning application. To detect drift, the tool continuously monitors input data, outputs, and/or technical resources (e.g., processor, memory, network, and input/output resources) used to generate outputs. The tool analyzes changes to input data, outputs, and/or resource usage to determine when drift has occurred. When drift is determined to be occurring, the tool retrains a model for a machine learning application. In this manner, the tool automatically detects and corrects model drift, which improves the accuracy of the machine learning application. In certain embodiments (e.g., during a natural disaster), improving the accuracy of the machine learning application improves the safety of users. The system will be described in more detail using FIGS. 1 through 3.

FIG. 1 illustrates an example system 100. As seen in FIG. 1, system 100 includes one or more devices 104, a network 106, and a model correction tool 108. Generally, model correction tool 108 monitors various metrics associated with the performance of a machine learning application or model to determine if model drift is occurring. Model correction tool 108 then retrains the machine learning application or model if model drift is detected. In particular embodiments, model correction tool 108 improves the accuracy of the machine learning application or model by detecting and correcting model drift.

One or more users 102 use one or more devices 104 to communicate with other components of system 100. For example, a user 102 may use devices 104 to build, administer, and/or maintain machine learning application 114 and/or model 116. User 102 may use devices 104 to communicate instructions and/or messages to model correction tool 108 through a network 106. Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Model correction tool 108 monitors for and detects model drift in a machine learning application or model. When detected, model correction tool 108 retrains the machine learning application and/or model to correct the model drift. As seen in FIG. 1, model correction tool 108 includes a processor 110 and a memory 112. This disclosure contemplates processor 110 and memory 112 being configured to perform any of the actions and functions of model correction tool 108 described herein. In particular embodiments, model correction tool 108 improves the accuracy of a machine learning application and/or model by detecting and correcting model drift.

Processor 110 is any electronic circuitry, including, but not limited to microprocessors, application specific integrated circuits (ASIC), application specific instruction set processor (ASIP), and/or state machines, that communicatively couples to memory 112 and controls the operation of model correction tool 108. Processor 110 may be 8-bit, 16-bit, 32-bit, 64-bit or of any other suitable architecture. Processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 110 may include other hardware that operates software to control and process information. Processor 110 executes software stored on memory to perform any of the functions described herein. Processor 110 controls the operation and administration of model correction tool 108 by processing information received from devices 104, network 106, and memory 112. Processor 110 may be a programmable logic device, a microcontroller, a microprocessor, any suitable processing device, or any suitable combination of the preceding. Processor 110 is not limited to a single processing device and may encompass multiple processing devices.

Memory 112 may store, either permanently or temporarily, data, operational software, or other information for processor 110. Memory 112 may include any one or a combination of volatile or non-volatile local or remote devices suitable for storing information. For example, memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 112, a disk, a CD, or a flash drive. In particular embodiments, the software may include an application executable by processor 110 to perform one or more of the functions described herein.

Model correction tool 108 monitors a machine learning application 114 and/or a model 116. Generally, machine learning application 114 applies model 116 to input data to make output predictions. Model 116 may be built by users 102 using devices 104. Over time, model 116 may begin experiencing drift (e.g., concept drift and/or data drift). When drift occurs, machine learning application 114 may begin making less accurate predictions when applying model 116. If left unremedied, the drift may grow more severe, which results in even less accuracy. In certain embodiments, the degradation in accuracy jeopardizes the safety of users 102. For example, if machine learning application 114 is tasked with predicting the meaning of a user's 102 spoken words during a natural disaster to determine what kind of aid to send to users 102, a degradation in the accuracy of the predictions may result in incorrect aid being sent or aid being sent to incorrect locations. By improving and/or maintaining accurate predictions, the safety of users 102 may be maintained.

Generally, model correction tool 108 monitors the performance of machine learning application 114 to detect model drift. When the performance of machine learning application 114 and/or model 116 falls below a certain standard, model correction tool 108 may retrain model 116 to improve the accuracy of machine learning application 114 and/or model 116.

Model correction tool 108 receives input 118A. Model correction tool 108 may receive input 118A from any suitable source. For example, model correction tool 108 may receive input 118A from one or more devices 104. As another example, model correction tool 108 may receive input 118A from a database and/or one or more sensors. Input 118A may be any suitable type of data. For example, input 118A may be spoken words and/or written text. As another example, input 118A may be sensed or detected environment characteristics such as heat, humidity, size, occupancy, location, etc. As yet another example, input 118A may indicate user actions taken or user preferences.

Machine learning application 114 may apply model 116 to input 118A to predict an output 120A. Machine learning application 114 may apply any suitable model 116 depending on the purposes of machine learning application 114. For example, if machine learning application 114 is designed to interpret the meaning of spoken words and/or text, machine learning application 114 may apply a natural language understanding model 116 to spoken words and/or text. As another example, if machine learning application 114 is designed to predict natural phenomenon, machine learning application 114 may predict a weather model 116 to environmental characteristics.

Machine learning application 114 predicts output 120A by applying model 116 to input 118A. Output 120A may be used to make any suitable decisions about any suitable real world activities. For example, during a natural disaster, output 120A may be used to determine what aid or supplies should be sent to a user 102. As another example, output 120A may be used to predict future weather phenomenon during a natural disaster to determine where aid should be sent. As yet another example, output 120A may be used to predict the movement of users 102 to determine what kind of aid may be needed in the future.

When data drift occurs, statistical properties involving the values or distributions of input 118A may shift unexpectedly. For example, a statistical or time series distribution of values for input 118A may shift over time such that the expected values of input 118A change. In a time series distribution, the values of input 118A may be arranged in time sequence and the distribution of those values across the time series is evaluated to detect changes in the distribution. As another example, statistical properties of input 118A (e.g., frequency, mean, median, mode, minimum value, maximum value, count, percent, range, variance, standard deviation, ranks, etc.) may change when data drift occurs. As a result, the output 120A or expected output 120A generated from input 118A may also shift unexpectedly. In other words, the shift in input 118A does not cause a shift in the actual values of output 120A in the real world but does cause a shift in the predicted values of output 120A through applying model 116. Consequently, this shift in input 118A causes predicted output 120A to be less accurate.

When concept drift occurs, output 120A may become less accurate. Even though the value of output 120A is the same for the same input 118A, the accuracy may nevertheless drop because the variable being predicted by model 116 has changed or drifted over time. The drop in the accuracy may have severe consequences such as jeopardizing the safety of users 102. For example, if output 120A is a predicted meaning of spoken words, concept drift may occur if the meaning of the words (as understood by the users) has changed (e.g., through slang or vocabulary changes). As a result, although model 116 may have predicted a meaning that was correct at a previous time, that meaning is no longer correct due to the change.

In certain embodiments, model correction tool 108 also monitors the technical or computing resources used 122A (e.g. processor resources, memory resources, network resources, input/output resources, etc.) for machine learning application 114 to apply model 116 to input 118A to predict output 120A. Model correction tool 108 may track the amount of resources used 122A by machine learning application 114. When drift occurs, the amount of technical resources used 122A may change. Some types of drift may cause machine learning application 114 to use more resources and some types of drift may cause machine learning application 114 to use less resources. By monitoring the resources used 122A and detecting deviations from the normal amount of resources used, model correction tool 108 may detect the presence of model drift.

Model correction tool 108 may monitor input 118A, output 120A, and/or resources used 122A to determine whether model drift has occurred. Model correction tool 108 may compare input 118A to historical input 118B, output 120A to historical 120B, and resources used 122A to historical resources used 122B to determine whether model drift has occurred. For example, model correction tool 108 may compare statistical properties of input 118A such as the statistical distribution of input 118A against the statistical distribution of historical input 118B. As another example, model correction tool 108 may compare the accuracy of output 120A with the accuracy of historical output of 120B. Another example, model correction tool 108 may compare resources used 122A with historical resources used 122B. Through these comparisons, model correction tool 108 may detect deviations that are indicative of model drift.

Model correction tool 108 generates a drift score 124 by comparing input 118A, output 120A, and/or resources used 122A with input 118B, output 120B, and/or resources used 122B. Drift score 124 may indicate the likelihood that model drift has occurred. In certain embodiments, drift score 124 may be formed by taking weighted averages of the various comparisons made by model correction tool 108. Model correction tool 108 compares drift score 124 to a threshold 126. If drift score 124 exceeds threshold 126, then model correction tool 108 may determine that model drift has occurred. If drift score 124 falls below threshold 126, model correction tool 108 may determine that model drift has not occurred. If model correction tool 108 has determined that model drift has occurred, model correction tool 108 may retrain model 116 to correct the model drift.

In particular embodiments, model correction tool 108 maintains a record 128 that tracks changes in inputs 118, outputs 120, and resources used 122. For example, record 128 may track the values of inputs 118, outputs 120, and resources used 122 over time. Model correction tool 108 may use these recorded values as the historical values during comparisons to determine if model drift is occurring. As new input 118, output 120, and resources used 122 are generated, model correction tool 108 may add the new input 118, output 120, and resources used 122 to record 128.

In some embodiments, model correction tool 108 operates automatically as part of a model governance framework 130. Model governance framework 130 is an automated system that monitors and governs model 116. Model correction tool 108 may perform operations in response to commands or instructions issued by model governance framework 130. For example, model correction tool 108 may automatically monitor for model drift in model 116 based on instructions from model governance framework 130. Model correction tool 108 may also automatically retrain model 116 when model drift is detected based on instructions from model governance framework 130. Model governance framework 130 may be a separate system from system 100 and may include a set of rules for operating model correction tool 108. Model correction tool 108 may be a component of model governance framework 130.

FIG. 2 illustrates an example model correction tool 108 of the system 100 of FIG. 1. Generally, model correction drift 108 detects model drift by monitoring inputs 118, outputs 120, and resources used 122. When model drift is detected, model correction tool 108 retrains a model 116 to correct the model drift. In particular embodiments, by detecting and correcting model drift, model correction tool 108 improves the accuracy of predictions, which improves the safety of users 102.

Model correction tool 108 monitors a machine learning application 114 and a model 116. Generally, machine learning application 114 applies model 116 to inputs 118 to predict outputs 120. When model drift occurs, the accuracy of the predictions made by machine learning application 114 decreases. As this accuracy decreases, the effectiveness of machine learning application 114 dwindles. In some embodiments, the dwindling effectiveness of machine learning application 114 jeopardizes the safety of users 102.

Machine learning application 114 applies model 116 to received input 118A to predict output 120A. Machine learning application 114 may use a certain amount of technical resources (e.g., processor, memory, and/or network resources) to apply model 116 to input 118A to predict output 120A. Model correction tool 108 monitors input 118A, output 120A, and resources used 122A to determine if model drift has occurred.

Model correction tool 108 may determine statistical properties of input 118A such as a distribution 202A of input 118A. Distribution 202A may be any suitable distribution, such as, for example, a time series distribution or a statistical distribution. Distribution 202A may indicate the distribution of values of input 118A. Model correction tool 108 may compare input 118A with historical inputs 118B by comparing distribution 202A with historical distribution 202B. Distribution 202B may be any suitable distribution of the values of historical inputs 118B, such as, for example, a time series distribution or statistical distribution. By comparing distribution 202A and historical distribution 202B, model correction tool 108 can detect a change in the values of input in 118A relative to historical inputs 118B indicative of data drift. If the change is significant, model correction tool 108 may determine that a form of data drift has occurred that affects the values of input 118A.

Model correction tool 108 determines an accuracy 204A of output 120A, which can be used to determine the accuracy of model 116 and whether model 116 has become more inaccurate. Model correction tool 108 may determine accuracy 204A by comparing output 120A to actual values of the variable being predicted. Deviations between output 120A and the actual values of the variable may reduce accuracy 204A. Model correction tool 108 may compare output 120A with historical outputs 120B by comparing accuracy 204A with historical accuracy 204B. Historical accuracy 204B may reflect the accuracy of historical outputs 120B when compared to actual values of the variable being predicted. If accuracy 204A begins deviating from accuracy 204B to a large degree, model correction tool 108 may determine that the accuracy of model 116 has changed because a form of model drift such as concept drift or data drift has occurred.

In certain embodiments, model correction tool 108 compares technical or computing resources used 122A with resources used 122B to determine deviations in the amount of technical resources by machine learning application 114 in applying model 116 to input 118A to generate output 120A. When model drift occurs, machine learning application 114 may begin using a different amount of resources to make the same predictions. As a result, resources used 122A may be higher or lower than historical resources 122B. When the deviation between resources used 122A and historical resources used 122B is large enough, model correction tool 108 may conclude that a form of model drift has occurred.

Model correction tool 108 applies weights 206A, 206B, and 206C to the comparisons to determine drift score 124. Model correction tool 108 applies weight 206A to a deviation between input 118A and historical inputs 118B. For example, weight 206A may be applied to a deviation between distribution 202A and distribution 202B. Model correction tool 108 applies weight 206B to a deviation between output 120A and historical output 120B. For example, model correction tool 108 may apply weight 206B to a deviation between accuracy 204A and accuracy 204B. Model correction tool 108 applies weight 206C to a deviation between resources used 122A and historical resources used 122B. Weights 206A, 206B, and 206C may be different from each other depending on how heavily each comparison impacts the determination of whether drift is occurring. Typically, the higher the weight 206, the more a particular comparison impacts the drift determination. Model correction tool 108 may then combine the weighted deviations to produce drift score 124. For example, drift score 124 may be a weighted average of these detected deviations.

Model correction tool 108 then compares drift score 124 to threshold 126 to determine if model drift has occurred. For example, if drift score 124 exceeds threshold 126 then model correction tool 108 determines that model drift has occurred. Otherwise, model correction tool 108 determines that model drift has not occurred. In particular embodiments, threshold 126 and/or weights 206 may be established by an administrator of model correction tool 108. Threshold 126 and/or weights 206 may also be set automatically by applying a machine learning process that predicts a sufficiently high threshold 126 and/or sufficient values of weights 206 for detecting model drift.

Model correction tool 108 retrains model 116 to produce retrained model 208 if model correction tool 108 determines that model drift has occurred. In certain embodiments, model correction tool 108 retrains model 116 by exposing model 116 to more current data. For example, model correction tool 108 may expose model 116 to more current data in addition to previous data used to train model 116. Model correction tool 108 may weigh the current data more heavily than the previous data so that model 116 retrains itself to handle the more current data (e.g., the data produced when drift has occurred). As a result, retrained model 208 may have less model drift relative to model 116. In some embodiments, retraining model 116 improves the accuracy of predicted outputs 120 and optimizes the amount of technical resources (e.g., processor, memory, and/or network resources) used to apply model 116 to predict outputs 120. In certain embodiments, model correction tool 108 automatically retrains model 116 when model drift is detected as part of a model governance framework 130.

Machine learning application 114 may then apply retrained model 208 on input 118A to generate outputs 210. Because retrained model 208 has less model drift than model 116, output 210 may be more accurate than output 120A in certain embodiments. As a result, output 210 reflects a more accurate prediction of a target variable, which in some embodiments, improves the safety of the user 102.

FIG. 3 is a flowchart illustrating a method 300 for operating a model correction tool 108 of a system 100 of FIG. 1. In particular embodiments, model correction tool 108 performs the steps of method 300. By performing method 300, model correction tool 108 detects and corrects model drift which improves the safety of users 102, in certain embodiments.

Model correction tool 108 begins by receiving an input data 118A into a machine learning application 114 in step 302. The input data 118A may have a particular distribution 202A. In step 304, model correction tool 108 compares the input data 118A with previous input data 118B to determine a change in the input data 118A. The previous input data 118B may have a distribution 202B. Model correction tool 108 may make the comparison by comparing distribution 202A and distribution 202B.

In step 306, model correction tool 108 receives an output prediction 120A. Machine learning application 114 may predict output 120A by applying a model 116 to input 118A. The output prediction 120A may have an accuracy 204A. In step 308, model correction tool 108 may determine accuracy 204A of the output 120A and compare with the accuracy 204B of historical output 120B to determine the accuracy of model 116. Model correction tool 108 may determine accuracy 204A by comparing output 120A with the actual values of the variable being predicted.

Model correction tool 108 then receives an indication of technical or computing resources used 122A in step 310. Resources used 122A may reflect an amount of technical resources (e.g., processor, memory, and/or network resources) used by machine learning application 114 to apply model 116 to inputs 118A. In step 312, model correction tool 108 determines a change in resources used. For example, model correction tool 108 may compare resources used 122A with historical resources used 122B to determine this change.

In step 314, model correction tool 108 determines a drift score 124. In particular embodiments, model correction tool 108 may determine drift score 124 by calculating a weighted average of the deviations between inputs 118A and historical inputs 118B, output 120A and historical outputs 120B, and resources used 122A and historical resources used 122B. In step 316, model correction tool 108 compares drift score 124 to threshold 126. If drift score 124 exceeds threshold 126, model correction tool 108 determines that model drift has occurred and retrains model 116 in step 318 to produce a retrained model 208. In some embodiments, retraining model 116 improves the accuracy of predicted outputs 120 and optimizes the amount of technical resources (e.g., processor, memory, and/or network resources) used to apply model 116 to predict outputs 120. If drift score 124 does not exceed threshold 126, model correction tool 108 may determine that model drift has not occurred.

Modifications, additions, or omissions may be made to method 300 depicted in FIG. 3. Method 300 may include more, fewer, or other steps. For example, steps may be performed in parallel or in any suitable order. While discussed as model correction tool 108 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:
receive an input data into a machine learning application;
compare the input data with previous input data into the machine learning application to determine a change in a statistical property of the input data;
receive an output prediction of the machine learning application made by applying a model on the input data;
determine an accuracy of the model by comparing the output with previous outputs generated by the model;
determine, based on the change in the statistical property of the input data and the accuracy of the model, a drift score for the model;
retrain the model when the drift score exceeds a threshold;
receive an indication of computing resources used by the machine learning application to make the output prediction based on the input data;
compare the indication of computing resources with previous indications of computing resources used when applying the model to determine a change in computing resources used when applying the model, the drift score is further based on a weighted average of the change in computing resources used when applying the model; and
wherein retraining the model optimizes the computing resources used when applying the model.

2. The apparatus of claim 1, wherein the computing resources comprises at least one of processor resources and memory resources.

3. The apparatus of claim 1, the hardware processor further configured to determine a time series distribution of the input data and the previous input data, the change in the input data is further determined based on the time series distribution.

4. The apparatus of claim 1, wherein the drift score is determined by calculating a weighted average of the change in the statistical property of the input data and the accuracy of the model.

5. The apparatus of claim 1, wherein retraining the model when the drift score exceeds the threshold occurs automatically as part of a model governance framework.

6. A method comprising:
receiving, by a hardware processor communicatively coupled to a memory, an input data into a machine learning application;

comparing, by the hardware processor, the input data with previous input data into the machine learning application to determine a change in a statistical property of the input data;
receiving, by the hardware processor, an output prediction of the machine learning application made by applying a model on the input data;
determining, by the hardware processor, an accuracy of the model by comparing the output with previous outputs generated by the model;
determining, by the hardware processor and based on the change in the statistical property of the input data, the accuracy of the model, and a change in processor resources and memory resources used when applying the model, a drift score for the model;
retraining, by the hardware processor, the model when the drift score exceeds a threshold;
receiving, by the hardware processor, an indication of computing resources used by the machine learning application to make the output prediction based on the input data;
comparing, by the hardware processor, the indication of computing resources with previous indications of computing resources used when applying the model to determine a change in computing resources used when applying the model, the drift score is further based on a weighted average of the change in computing resources used when applying the model; and
wherein retraining the model optimizes the computing resources used when applying the model.

7. The method of claim 6, wherein the computing resources comprise at least one of processor resources and memory resources.

8. The method of claim 6, further comprising determining, by the hardware processor, a time series distribution of the input data and the previous input data, the change in the input data is further determined based on the time series distribution.

9. The method of claim 6, wherein the drift score is determined by calculating a weighted average of the change in the statistical property of the input data and the accuracy of the model.

10. The method of claim 6, wherein retraining the model when the drift score exceeds the threshold occurs automatically as part of a model governance framework.

11. A system comprising:
a device; and
a model correction tool comprising:
a memory; and
a hardware processor communicatively coupled to the memory, the hardware processor configured to:
receive, from the device, an input data into a machine learning application;
compare the input data with previous input data into the machine learning application to determine a change in a statistical property of the input data;
receive an output prediction of the machine learning application made by applying a model on the input data;
determine an accuracy of the model by comparing the output with previous outputs generated by the model;
determine, based on the change in the statistical property of the input data, the accuracy of the model, and a change in processor resources and memory resources used when applying the model, a drift score for the model;
retrain the model when the drift score exceeds a threshold;
receive an indication of computing resources used by the machine learning application to make the output prediction based on the input data;
compare the indication of computing resources with previous indications of computing resources used when applying the model to determine a change in computing resources used when applying the model, the drift score is further based on a weighted average of the change in computing resources used when applying the model; and
wherein retraining the model optimizes the computing resources used when applying the model.

12. The system of claim 11, wherein the computing resources comprises at least one of processor resources and memory resources.

13. The system of claim 11, the hardware processor further configured to determine a time series distribution of the input data and the previous input data, the change in the input data is further determined based on the time series distribution.

14. The system of claim 11, wherein the drift score is determined by calculating a weighted average of the change in the statistical property of the input data, the accuracy of the model, and the change in processor resources and memory resources used when applying the model.

* * * * *